US005552049A

United States Patent [19]
Gray

[11] Patent Number: 5,552,049
[45] Date of Patent: Sep. 3, 1996

[54] CERAMIC FIBER REINFORCED FILTER

[75] Inventor: Paul E. Gray, North East, Md.

[73] Assignee: Du Pont Lanxide Composites, L.P., Newark, Del.

[21] Appl. No.: 375,092

[22] Filed: Jan. 19, 1995

[51] Int. Cl.$^6$ .................................................... B01D 71/02
[52] U.S. Cl. ..................... 210/490; 210/496; 210/510.1; 210/500.26
[58] Field of Search ........................... 210/500.26, 510.1, 210/496, 490; 55/523, 524; 264/63, 62

[56] References Cited

U.S. PATENT DOCUMENTS

| | | | |
|---|---|---|---|
| 4,761,323 | 10/1986 | Muhlratzer et al. | 428/198 |
| 4,968,467 | 7/1989 | Zievers | 264/62 |
| 5,071,457 | 12/1991 | Schmidt, Jr. et al. | 55/523 |
| 5,075,160 | 6/1988 | Stinton et al. | 428/282 |
| 5,196,120 | 4/1992 | White | 210/504 |
| 5,411,762 | 5/1995 | Thebault et al. | 427/226 |

Primary Examiner—Frank Spear

[57] ABSTRACT

A ceramic fiber reinforced filter is prepared by depositing a thin filtration layer of preselected pore size on a more porous ceramic support. The filter is characterized by a low pressure drop across the filtration layer in operation and easy back pressure pulse cleaning.

12 Claims, 3 Drawing Sheets

CERAMIC FIBER REINFORCED FILTER

BACKGROUND OF THE INVENTION

Ceramic fiber reinforced filters designed for high temperature operation in fluid streams are known and have been described, for example in U.S. Pat. Nos. 4,761,323 to Mühlratzer, et al; 5,075,160 to Stinton, et al; 4,968,467 to Zievers and 5,196,120 to White.

Although varied in construction, the filters described in these patents listed above and filters made by others are primarily porous supports having particles or fibers interspersed throughout out the body of the support to control the ultimate porosity and average pore size of the filter's internal structure.

Filters having this type of construction allow the fluid to flow through removing particulate material from the fluid stream by trapping the particles that are too large to pass through in the pores of the internal structure of the filter. During the early stages of operation, a thin layer of particles separated from the fluid builds up on the surface of these filters, and the pressure drop across the filter increases requiring that the filter be cleaned or replaced in order for the fluid flows to be maintained at some acceptable operating conditions.

Generally these filters can be cleaned by a pulse of back pressure, but even with a back pressure pulse not all the trapped particles can be effectively removed since particles are not only on the surface of the filter, but are also trapped throughout out the internal structure. As the number of filtration/cleaning cycles increases, more particles becomes lodged within the internal structure of the filter leading to the phenomena termed blinding. As the filter continues to be cycled, particles become permanently lodged within the internal structure. Since to properly clean these filters trapped particles must travel from inside the filter to the outside walls of the structure without being trapped within the pores that are ever growing smaller from the clogs of other trapped particles, the initial pressure drop after cleaning continues to increase and the filter is eventually totally blinded and riseless.

To be desirable, a filter shoulder have long run cycles before cleaning is required, and the filter needs to be one which is easily cleaned. Successful cleaning is required to restore the filter to original operating pressures and to realize desirable service life. The consequence of being unable to remove essentially all the material blocking the pores of the filter surface and its internal structure is shorter and shorter operation cycles between filter cleaning cycles, short filter service life and frequent replacements filter and down times in units of the operating process.

The present invention is directed to a filter construction characterized by thin filtration layer which is deposited on the surface of a porous support. The filtration layer can be made to have an average pore size that much smaller than the particles that are to be removed from the fluid so that the layer essentially becomes a barrier to absolutely partition particles from the fluid flow without allowing these same particles to enter into and clog the pores of the filtration layer and of the support. Thus, the filter of the present invention is characterized by a low pressure drop across the filter in fluid flows, and a filtration layer that can be efficiently and easily cleaned by means of back pressure pulse through many operation cycles.

SUMMARY OF THE INVENTION

A filter comprising a support which has a support surface and a body. The support has an average pore size that is from 50 to 250 microns. On the surface of the support is the filtration layer which is composed of ceramic particles that are bound at points of contact to one another and to the support surface by a ceramic binder. The layer has a thickness of from 0.2 to 2.0 mm and an average pore size of from 0.5 to 50 microns. The average pore size of the layer is selected such that it is lower than that of the support.

The support may comprise a ceramic fiber preform having a thin carbonaceous debonding layer uniformly covering the surface of the ceramic fibers and a ceramic coating over the debonding layer. A support having this construction is particularly strong and resistant to corrosion in hot gas streams.

The ceramic particles of the filtration layer can be selected from the group consisting of kaolin, alumna, mullite, cordierite, silicon nitride, silicon carbide and titanium dioxide. The particles of the filtration layer can be deposited on the support as a mixture of the selected particles in a pre-ceramic binder. After curing the binder, the resulting ceramic bonds the particles of the filtration layer to the support and to other particles of the layer at points of contact. The average pore size and the porosity of the filtration layer can be controlled by the selection of the particles from which the filtration layer is made.

BRIEF DESCRIPTION OF THE DRAWINGS

FIG. 2a at 20× and 2b at 100×.

DETAILED DESCRIPTION OF THE INVENTION

The filter of present invention is a filtration layer, a thin layer of ceramic particles, deposited on a porous support. The particles are bound at points of contact to one another and to the surface of the support by a ceramic binder. The filtration layer has thickness of from 0.2 to 2.0 mm and an average pore size of from 0.5 to 50 microns. The process of depositing the filtration layer on the surface of the support gives a great deal of flexibility in the selection of the particles that can be used as constituents of the layer. Particles that constitute the layer can be selected for a particular property that is due to their chemical composition, or they can be selected for their particular particle size and shape so that the pore structure of the layer can be controlled with some measure of precision. The average pore size of the filtration layer preferably is selected to allows for efficient removal of particles from a fluid. It is also desirable to make the layer thin. The filtration layer of the present invention is concentrated on the surface of the support resulting in a surprisingly low pressure drop across the filter. Thus fluids, particularly hot gases, can be efficiently filtered to remove particulates. The filtration layer can be deposited on a support that is strong and suitable for use at temperatures up to 1200 degrees Centigrade.

The filtration layer is easily cleaned by a back a pressure pulse. Since the filtration layer is prepared from selected particles to have a particular pore size, the filtration layer functions as an absolute barrier to particles that would otherwise clog the internal structure of the support. The particulate material separated from the fluid stream adheres loosely to the surface of the present invention's filtration layer as a filter cake without penetrating into the structure of the support. A back pulse of pressure easily discharges the filter cake from the filtration layer.

The invention is more easily presented with reference to the drawings and to the process by which such a filter can be made.

Figure 1:
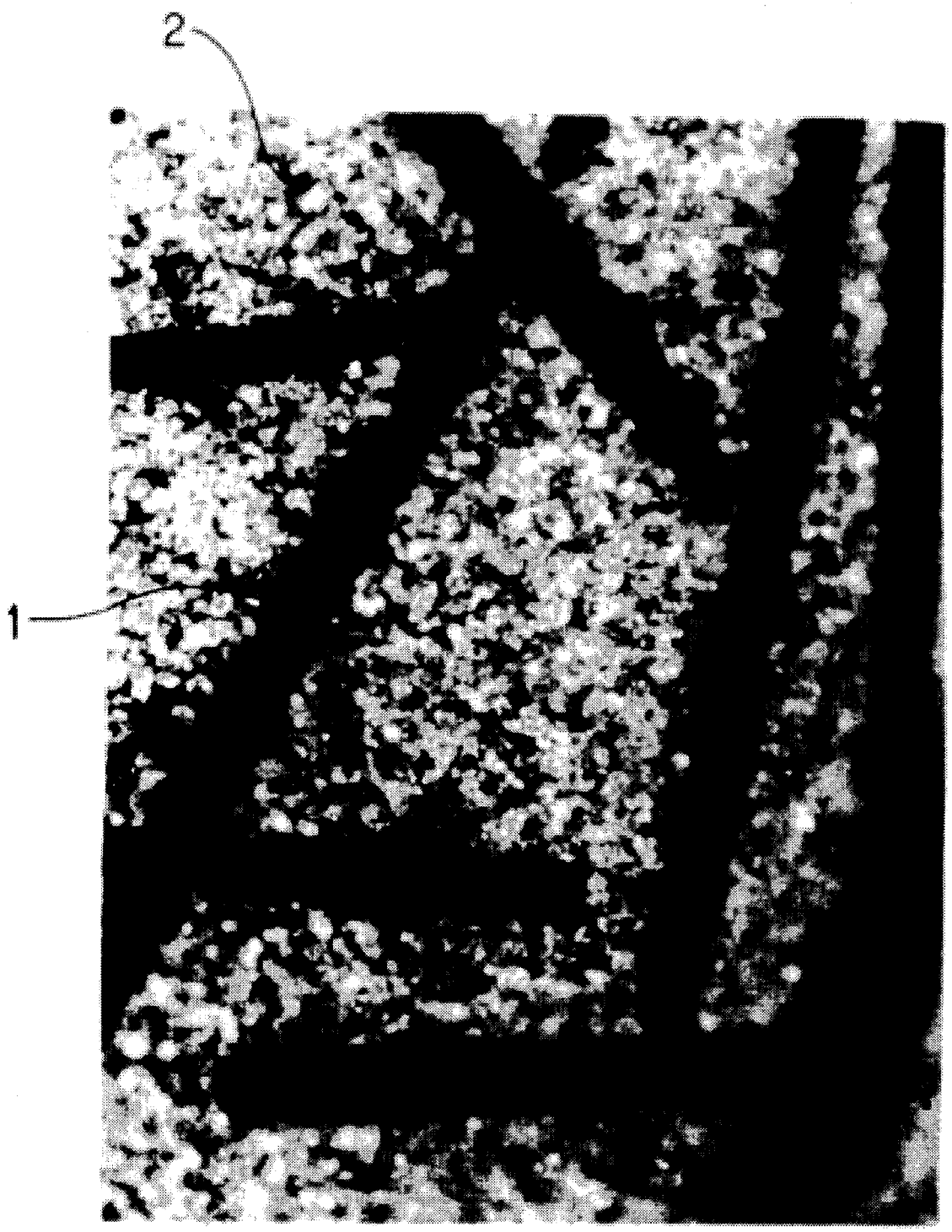
FIG. 1 photomicrograph of filtration layer and support at 100×.

FIG. 1 shows a photomicrograph at 100× of the filtration layer and the support as viewed by looking through the support to the interface of the support and the filtration layer. The fibers of the support 1 define relative large pores over which the filtration layer 2 of small ceramic particles is deposited.

Figure 2A:
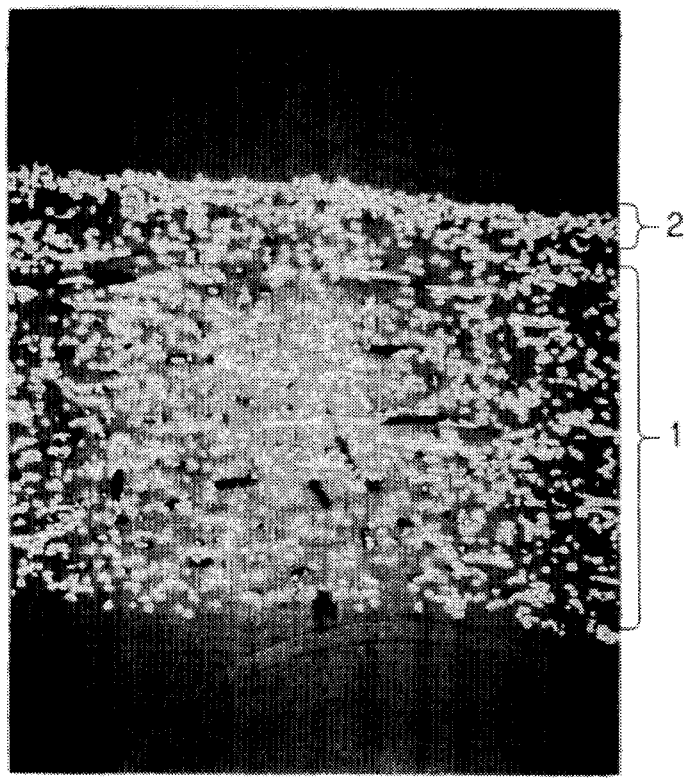
FIGS. 2a and 2b photomicrograph of side view of filtration layer and support.
Figure 2B:
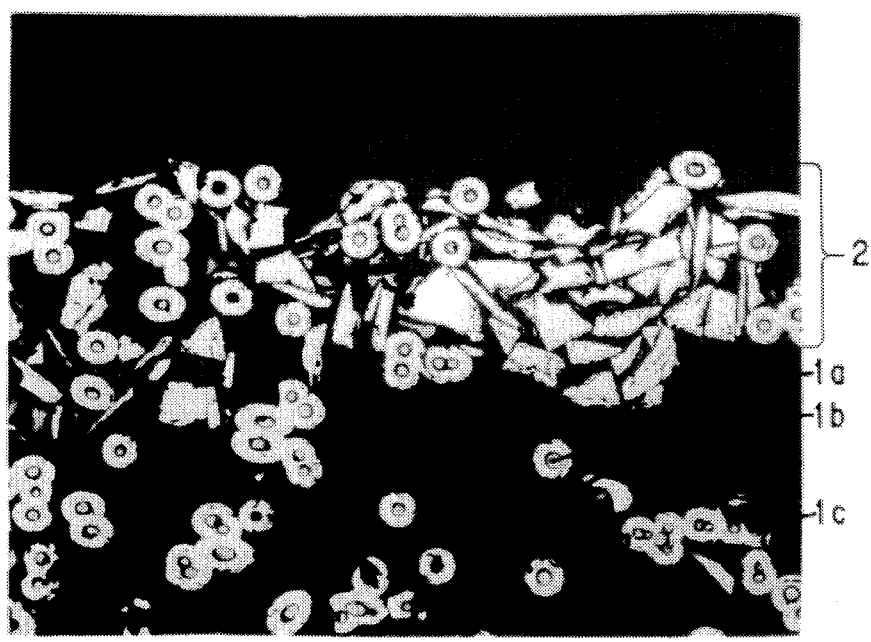
Figure 3:
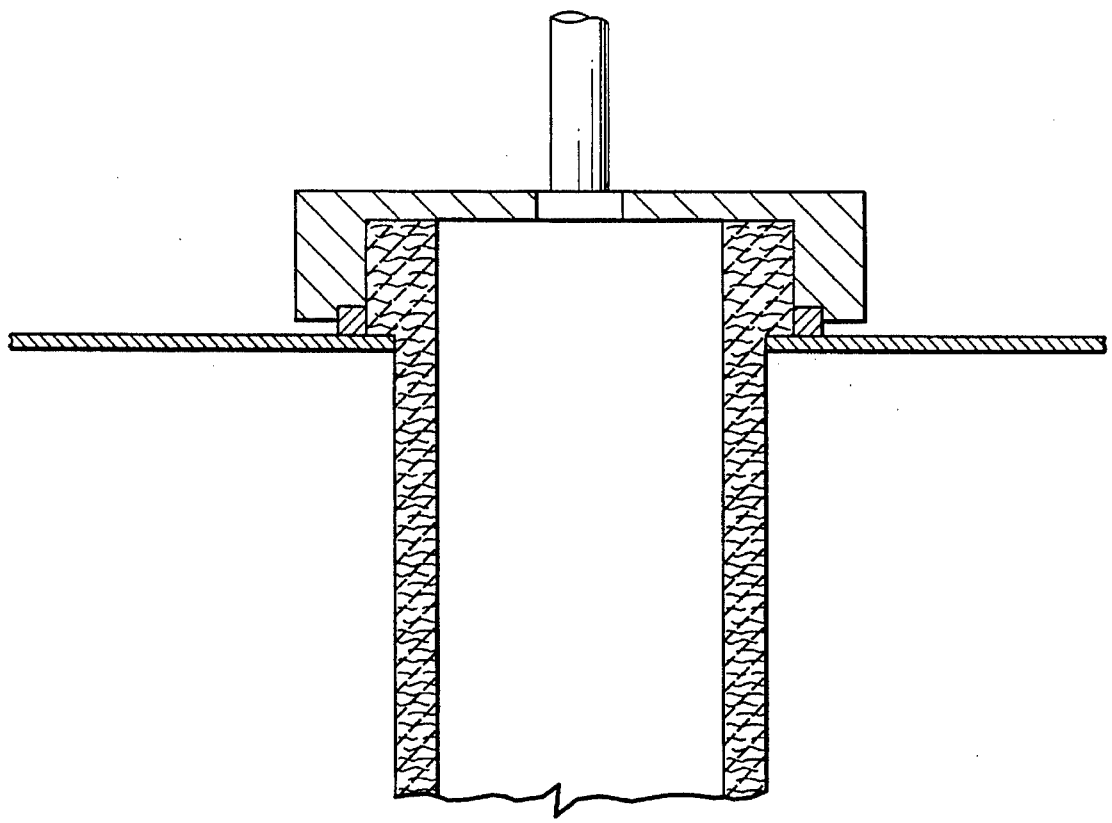
FIG. 3 drawing illustrating a candle filter of the present invention.

FIGS. 2a and 2b shows photomicrographs of the side view of the filtration layer and the support. The filtration layer 2 is seen at the top of the photographed surface. FIG. 2a is at 20 × magnification, and 2b is at 100× magnification. In FIG. 2a, the filtration layer is seen as a barrier layer at the surface of the support, and in FIG. 2b, the filtration layer is seen as irregular particles bridging over an open pore of the surface of the support.

Although any support having the desired porosity and stability in the operating conditions to which the filter is to be exposed can be used, the figures show the preferred support. In FIG. 2b the fibers of the support 1 are seen as layered cross sections. The fiber core 1a is uniformly coated with a carbonaceous debonding layer 1b. Over the debonding layer is a uniform ceramic layer 1c which gives the support strength and toughness. The average pore size of the support is controlled by selecting suitable fiber diameters and suitable weaves, braiding, or bundling of the fibers or yarns of the fibers into a preform for the support.

The filtration layer is formed of small ceramic or refractory particles that are bound to the support surface and to other particles of the filtration layer at points of contact by a ceramic binder which is formed by curing a pre-ceramic resin such as polyureasilazane resin or polycarbosilane resin. In curing, the pre-ceramic resin forms very thin ceramic coating which adheres to the surfaces of the particles of the filtration layer and between the particles of the filtration layer and their points of contact with the support without filling in the pore structure of the filtration layer or the support surface.

The average pore size of the filtration layer is controlled by selecting a suitable particle size distribution for the particles from which the layer is to be made. There is great flexibility in selecting materials to be used as the particles of the filtration layer. Any particles having the desired particle size distribution and chemical stability in the operation environment for which the filter is to be used can be used to form the filtration layer. Although not intended to be an exhaustive listing, examples of such materials are kaolin, alumna, mullite, cordierite, silicon nitride, silicon carbide, and titanium dioxide.

This flexibility in selecting material from which the filtration layer can be made is of particular value in separating a color sensitive product from fluid stream or in separating a product that must meet high standards of purity. In the case of the color sensitive product, for example, the filtration layer can be formed of particles that are the same color as the product or may in fact be formed from the product material itself if the particles of the product meet the requirements for desired porosity of the filtration layer. In this way the potential color contamination problem from possible spalling of the filtration layer can be avoided. Selection of particles from which the filtration layer is formed also allow for easier design of filters for strongly reducing conditions or for use in hot combustion gases.

A filter of the present invention can be manufactured by first preparing a support. The support can be any porous material that can with stand the conditions of use and that is more porous than the filtration layer. It is preferred that the support be particularly strong and resistant to corrosion. Such a support can be prepared by coating a preform with a carbonaceous debonding layer, then depositing a layer of silicon carbide over the entire preform. Isothermal chemical vapor infiltration (CVI) is the preferred technique for applying the ceramic coating to the preform. Other techniques know in the art such as forced flow CVI may also be used. It is also preferred to deposit the carbonaceous debonding layer by CVI so that the coating is extremely uniform.

The filtration layer is deposited on the support structure by coating or gently rubbing a mixture of the ceramic particles selected to form the filtration layer and the liquid pre-ceramic resin. The technique used to deposit the layer on the support should employ enough force to cause the particles to adhere to the support, but no so much force as to cause the particles to penetrate significantly into the pores of the support. Once deposited on the support surface this uncured coating of particles and resin is cured to convert the liquid resin into a ceramic. The resulting filter is both strong and highly serviceable.

Example illustrate the manufacture and performance of a filter made according to the present invention. The examples are not intended to limit the invention.

EXAMPLE 1

A candle filter was prepared by first constructing the support by winding a Nicalon chopped SiC fiber mat (available as 200 g/m$^2$ from Nippon Carbon Co.) onto a cylindrical graphite mandrel having a 6 cm (2.4 in) outside diameter and a length of 89 cm (35 in). About 2 wraps were required to build up a thickness of 0.5 cm (0.2in). The mat was then secured to the mandrel with graphite tooling. An additional 3 wraps of the mat 5 cm (2 in) wide were wound onto one end of the preform to build up an attachment sleeve. These wraps were also secured with graphite tooling.

The completed preform was then placed in a pyrolytic carbon CVI reactor and infiltrated until 0.5 to 1.0 microns of carbon were deposited onto the individual filaments. The reactor was then cooled and the work piece removed. The mandrel was withdrawn from the tooling leaving a fragile, free-standing tube. A plug for the end of the tube opposite the flange area was constructed from a 7.6 cm (3 in) disks of the chopped SiC fiber mat. The disks were darted on the edges and inserted into the end of the tube forming a plug having a diameter of 7.1 cm (2.8 in).

The completed preform was placed in an isothermal CVI reactor at about 1000° C. and infiltrated until a final specific gravity of 1.00 to 1.10 grams was achieved. The preform was then removed from the reactor and trimmed on a lathe to assure dimensional tolerance. This preform was used as the support for the filtration layer.

180 and 800 mesh SiC powder (available from Cerac Co.) was used to make two grades of filtration layer: grade S-180 and grade S-800. The S-180 formed a filtration layer of about 10 micron average pore size and the S-800 formed a filtration layer having an average pore size of about 1 micron.

The 10 micron filtration layer (S-180) was prepared by mixing 100 grams of the 180 mesh powder with 20 grams of polyureasilazane resin (available as Ceraset SN-L from the Hercules Co.) and 100 grams toluene to make a slurry. The slurry was then applied to the surface of the support with a paint brush to "grout" the slurry onto the outer surface of the preform. Care was taken that the slurry not be forced into the pores and internal structure of the preform. The slurry was deposited carefully, too, to ensure that the filtration layer be thin. Typically this layer was about 0.2 to 2.0 mm thick.

The slurry coated support was then dried in a forced flow air oven at 150° C. for 1 hour. After cooling, the dry coated support surface was lightly brushed with a nylon pad to remove loose powder. The filtration layer was then formed by curing the coating in a nitrogen blanketed furnace at 1000° C. The temperature of the furnace was increased from room temperature to 1000° C. over a period of 4 hours and then held at 1000° C. for 4 hours to complete the cure.

EXAMPLE 2

A cross flow filter was made by cutting individual plies of the SiC fiber mat. These plies were laid up on a block about 7.62 cm by 7.62 cm by 22.9 cm (3 in×3 in ×9 in). The block was placed in a graphite tooling and processed through CVI as detailed in Example 1 to produce the support for the cross flow filtration layer. This support was coated with the S180 grade slurry mixture of Example 1 to produce the filtration layer.

EXAMPLE 3

Cross flow filters were made using S-800 grade SiC powder and titanium dioxide powder to demonstrate filtration layers made with particles having an average particle size of about 1 micron and less. These filtration layers were deposited on the SiC fiber mats preforms prepared according to Example 2. The S-800 filtration layer was generated by coating the mat with a slurry composed of 100 grams 800 mesh SiC powder, 100 grams toluene and 20 grams of the Ceraset SN-L resin. This coating was applied and cured as described in Example 1. Disks from this filter material were tested for thermal shock and permeability as described below.

Cross flow filters employing a titanium dioxide filtration layer were also made from the SiC fiber mat supports as described in Example 2. The $TiO_2$ filtration layer was deposited from a slurry made by mixing 100 grams of −200+325 mesh sintered titanium dioxide power into 100 grams toluene and 20 grams of the Ceraset SN-L resin. The titanium dioxide powder slurry was then coated on the preform support and cured as described in Example 1. Disks cut from this filter material were also tested for thermal shock and permeability.

Permeability Testing was performed by mounting disks of these cross flow filters or a control made of the uncoated support preform in a pressure drop-flow tester and measuring the pressure drop across the filter at a face velocity of 0.508 cm/sec (10 feet per minute). The data obtained is shown in Table 1.

TABLE 1

Comparison of Pressure Drop at a Flow of 0.508 cm/sec of the Control Mat and Filtration layer Filters Measured in dynes/cm$^2$

| Filtration Layer | | Pres. Drop @ 10 ft/min in inches of $H_2O$ @ 60° F. |
|---|---|---|
| Control | None | 42.3(0.017) |
| Example 2 | S-180 | 72.16(0.029) |
| Example 3 | S-800 | 164.2(0.066) |
| Example 3 | $TiO_2$ Layer T-200 | 86.3(0.0035) |

Thermal cycling resistance was measured by thermally cycling specimens of the cross flow filters having filtration layers made using S180 and S800 particles between room temperature and 900° C. about 500 times. The samples were placed in the hot furnace for 5 minutes, withdrawn and then allowed to cool for 5 minutes. After the 500 cycles were run, no evidence of spalling of the filtration layer was observed for either of the filtration layers.

In a second thermal stability test, a 3.81 (1.5 in) diameter disks of the cross flow filters were fitted into one end of a 304 stainless steel tube with the filtration layer facing out. The other end of the 304 tube was sealed except for a small quarter inch tube which extended through the larger tube to within 1 inch of the filtration layer. The stainless tube assembly was placed in a furnace and heated to 500°–700° C. A solenoid valve pulsed cold air at 10 psi onto and through the filter with the membrane for 2 seconds to simulate the thermal shock which occurs during pulsing. No failure of the specimen or loosening of the filtration layer was observed even after about 1000 cycles. One of the specimens previously tested in the 5 minute thermal cycles to 900° C. was also run in this pulse simulation procedure and showed no degradation even after several hundred of the 900° C. cycles and about 500 of the cold air pulses.

EXAMPLE 4

Blinding resistance and pressure drop under flow conditions were tested using a 6.6 cm (2.6 in) diameter by 88.9 cm (35 in) long candle filter at room temperature in an instrumented bag house assembly. Tests of a control having no filtration layer and a filter having the S-180 filtration layer of Example 1 were run at the following conditions:

| | |
|---|---|
| Face Velocity | 0.508 cm/sec(10 feet per minute) |
| Actual Flow | 9.44 l/sec(20 SCFM) |
| Pulse Pressure | 345 KPa(50 PSIG) |
| Pulse Accumulator Vaolume | 1.6l(~100 cu. in) |
| Filter Particles | Fly Ash(0.1–20 microns) |
| Filter Cake Loading | 2.4 gk/m$^2$(~0.5 lb per ft$^2$) of element |

The control quickly was blinded as evidenced by the spotty cake release upon pulsing. The pressure drop was about 498 dynes/cm$^2$ (0.2 in of $H_2O$) at the start, about 3732 dynes/cm$^2$ (1.5 in of $H_2O$) prior to pulsing, and about 1990 dynes/cm$^2$ (0.8 in of $H_2O$) after pulsing.

The filtration layer candle filter made according the Example 1 had a starting pressure drop of about 1990 dynes/cm$^2$ (0.8 in of $H_2O$) 1990 dynes/cm$^2$ (0.8 in of $H_2O$),that increased to about 3732 dynes/cm$^2$ (1.5 in of $H_2O$) prior to pulsing, and then decreased to about 2488 dynes/cm$^2$ (1 in of $H_2O$) just after pulsing. The cake released very cleanly during all pulsing trials and no evidence of blinding was observed.

What is claimed is:

1. A filter comprising:

a) a support with a support surface and a body having an average pore size of from 50 to 250 microns and wherein the support consists of ceramic fibers with a ceramic coating of generally uniform thickness throughout the support securing the fibers together and a refractory carbonaceous interfacial layer of generally uniform thickness between the fibers and the ceramic coating b) on the support surface, a filtration layer of ceramic particles that are bound at points of contact to one another and to the support surface by a cured ceramic binder wherein the layer has a thickness of from 0.2 to 2.0 mm and an average pore size of from 0.5 to 50 microns and the average pore size of the layer is selected such that it is lower than that of support.

2. The filter of claim 1 wherein the ceramic particle are selected from the group consisting of kaolin, alumina, mullite, cordierite, silicon nitride, silicon carbide and titanium dioxide.

3. The filter of claim 1 wherein the cured binder is silicon carbide formed by curing a silicon-containing ceramic precursor binder.

4. The filter of claim 1 in the shape of a tube with one closed end.

5. The filter of claim 1 wherein the fibers are silicon carbide fibers.

6. A method for making a ceramic fiber reinforced filter comprising:

a) fabricating a porous filter support by shaping ceramic fibers into a preform and exposing the preform to chemical vapor infiltration, the chemical vapor infiltration depositing a refractory carbonaceous interfacial layer on the fibers of generally uniform thickness and subsequently depositing a ceramic over the interfacial layer;

b) forming the filtration layer having a lower average pore size than the support by coating a surface of the support with a mixture of ceramic particles and a ceramic precursor binder to form a green coating; and c) heating the green coating to convert the ceramic precursor binder into a ceramic.

7. The process of claim 6 wherein the ceramic particles are selected from the group consisting of kaolin, alumina, mullite, cordierite, silicon nitride, silicon carbide and titanium dioxide.

8. The process of claim 6 wherein the ceramic deposited on the support is silicon carbide.

9. The process of claim 6 wherein binder is silicon carbide formed by curing a silicon-containing ceramic precursor binder.

10. The process of claim 6 wherein the filtration layer has a thickness of 0.2 to 2 mm.

11. The process of claim 6 wherein the preform has the shape of a tube with one closed end.

12. The process of claim 6 wherein the fibers are silicon carbide fibers.

* * * * *